US010859142B2

(12) United States Patent
Williams

(10) Patent No.: US 10,859,142 B2
(45) Date of Patent: Dec. 8, 2020

(54) SLIP-MODULATED PROPRIOCEPTIVE INFINITELY VARIABLE TRANSMISSION AND ROBOTIC POWER DISTRIBUTION SYSTEM

(71) Applicant: Stephen Douglas Williams, Vallejo, CA (US)

(72) Inventor: Stephen Douglas Williams, Vallejo, CA (US)

( * ) Notice: Subject to any disclaimer, the term of this patent is extended or adjusted under 35 U.S.C. 154(b) by 117 days.

(21) Appl. No.: 16/179,883

(22) Filed: Nov. 3, 2018

(65) Prior Publication Data

US 2019/0128390 A1     May 2, 2019

Related U.S. Application Data

(60) Provisional application No. 62/580,930, filed on Nov. 2, 2017.

(51) Int. Cl.

| | |
|---|---|
| *F16H 15/10* | (2006.01) |
| *F16H 15/50* | (2006.01) |
| *B25J 9/10* | (2006.01) |
| *F16H 15/18* | (2006.01) |
| *F16H 29/16* | (2006.01) |
| *F16H 15/36* | (2006.01) |
| *B25J 9/08* | (2006.01) |

(52) U.S. Cl.
CPC .............. *F16H 15/10* (2013.01); *B25J 9/08* (2013.01); *B25J 9/102* (2013.01); *B25J 9/104* (2013.01); *F16H 15/18* (2013.01); *F16H 15/36* (2013.01); *F16H 15/503* (2013.01); *F16H 29/16* (2013.01)

(58) Field of Classification Search
CPC .......... F16H 15/10; F16H 15/36; F16H 29/16; F16H 15/18; F16H 15/503; F16H 15/20; B25J 9/08; B25J 9/102; B25J 9/104
See application file for complete search history.

(56) References Cited

U.S. PATENT DOCUMENTS

| | | |
|---|---|---|
| 761,384 A | 5/1904 | Lambert |
| 954,977 A | 4/1910 | Lambert |
| (Continued) | | |

FOREIGN PATENT DOCUMENTS

WO    WO 2018/0656579      4/2018

*Primary Examiner* — Michael C Zarroli

(57) ABSTRACT

A transmission or actuator offering one or more rotational outputs proportionate in speed and direction to that of a common rotational input, each with its own ratio coupled with a controllable dynamic slip/compliance element and optionally either of a one-way bearing or brake preventing back driving. Ratios are continuously variable between positive and negative values, including infinity, varied by mechanical or electromechanical actuators under external or computer control. The transmission may intrinsically integrate multiple partial transmissions for increasing torque capability, rapidly changing between alternate settings, and/or to drive multiple outputs with customizable design. A communicating system of such distributed transmissions forming a hierarchy or network, each transmission driven directly by a motor, indirectly by the output of another transmission, or both, including indirect cumulative forward and back driving throughout the hierarchy or network. Such a network of actuators for complex robotic, manufacturing, movement, or transport applications.

17 Claims, 6 Drawing Sheets

(56) References Cited

U.S. PATENT DOCUMENTS

| | | |
|---|---|---|
| 8,251,863 B2 | 8/2012 | Faulring |
| 8,342,999 B2 * | 1/2013 | Miller ................... B60K 6/26 |
| | | 475/149 |
| 8,512,195 B2 | 8/2013 | Lohr |
| 9,481,244 B1 | 11/2016 | Koehler |
| 9,573,582 B2 | 2/2017 | Ishikawa |
| 9,587,721 B2 * | 3/2017 | Okulov ................ F16H 15/40 |
| 9,855,951 B1 | 1/2018 | Lister |
| 9,903,471 B2 | 2/2018 | Cui |
| 9,964,209 B2 | 5/2018 | Tay |
| 9,989,146 B1 * | 6/2018 | Abington .......... F16H 61/66272 |
| 10,011,282 B2 | 7/2018 | Jerwick |
| 10,232,877 B2 * | 3/2019 | Inal ................... B62D 11/105 |
| 2002/0169051 A1 * | 11/2002 | Oshidari ............ F16H 61/6649 |
| | | 476/10 |
| 2004/0262044 A1 * | 12/2004 | Schaaf .................. E21B 47/18 |
| | | 175/61 |
| 2009/0312145 A1 * | 12/2009 | Pohl ..................... F02B 67/04 |
| | | 477/37 |
| 2014/0179478 A1 | 6/2014 | Urabe |
| 2016/0178033 A1 * | 6/2016 | Chung .................... F16H 3/74 |
| | | 475/269 |
| 2018/0236867 A1 * | 8/2018 | Miller .................. F16H 15/40 |
| 2018/0266522 A1 * | 9/2018 | Chung .................... F16H 3/62 |
| 2019/0032732 A1 * | 1/2019 | Daavettila .............. F16D 48/02 |

\* cited by examiner

SLIP-MODULATED PROPRIOCEPTIVE INFINITELY VARIABLE TRANSMISSION AND ROBOTIC POWER DISTRIBUTION SYSTEM

CROSS-REFERENCE TO RELATED APPLICATIONS

I hereby claim benefit under Title 35, United States Code, Section 119(e) of U.S. provisional patent application Ser. No. 62/580,930 filed on Nov. 2, 2017 at 19:30:45. The 62/580,930 application is hereby incorporated by reference into this application.

ABSTRACT

A transmission or actuator offering one or more rotational outputs proportionate in speed and direction to that of a common rotational input, each with its own ratio coupled with a controllable dynamic slip/compliance element and optionally either of a one-way bearing or brake preventing back driving. Ratios are continuously variable between positive and negative values, including infinity, varied by mechanical or electromechanical actuators under external or computer control. The transmission may intrinsically integrate multiple partial transmissions for increasing torque capability, rapidly changing between alternate settings, and/or to drive multiple outputs with customizable design. A communicating system of such distributed transmissions forming a hierarchy or network, each transmission driven directly by a motor, indirectly by the output of another transmission, or both, including indirect cumulative forward and back driving throughout the hierarchy or network. Such a network of actuators for complex robotic, manufacturing, movement, or transport applications.

STATEMENT REGARDING FEDERALLY SPONSORED RESEARCH OR DEVELOPMENT

Not applicable to this application.

TECHNICAL FIELD

Classifications—CPC
F16H15/40 Gearings providing a continuous range of gear ratios in which two members co-operative by means of balls, or rollers of uniform effective diameter, not mounted on shafts
Y10T74/20305 Robotic arm
  Related or Referencing:
FO3G Mechanical-power producing devices or mechanisms, not otherwise provided for or using energy sources not otherwise provided for
F16D Couplings for transmitting rotation; clutches; brakes
B25J 17/00 Robot joints
H02K 7/116 distribution of power gears
F16H 37/08 with differential gearing
F16H 48/18 fluid gearing
F16H 61/664 Friction gearings
F16H 61/686 orbital gears
A01D 69/06 gearings in harvesters or mowers
B60K arrangement of transmissions in vehicles
B62M transmissions for cycles
F16H 61/00 control functions within change-speed or reversing-gearings for conveying rotary motion
61/46 automatic with output requirements
61/462 achieving target speed ratio
61/465 target input speed
61/47 target output speed
59/40 output shaft speed
59/42 input shaft speed
59/36 inputs being a function of speed
59/44 dependent on machine speed
61/456 control balance of torque or speed between pumps or motors hydrostatic differentials
F15B 11/00 Servomotor systems without provision for follow-up action
F15B 11/04 speed
F15B 11/046 depending on position
F15B 11/05 constant speed
G01P 3/00 measuring linear or angular speed
G01P 3/44 angular speed
G01P 3/46 amplitude of current/voltage
G01P 3/48 frequency c/v
G01P 3/49 eddy currents
G01P 3/56/58/60 comparing two speeds
H02P 5/46 speed regulation of two or more electric motors
H02P 5/48 comparing mechanical values representing speeds
H02P 5/485 using differential movement of two motors differential gearboxes
H02P 5/49 intermittently closing or opening electrical contacts
G01P measuring speed, presence, acceleration, direction of movement
G01P 3/02 mechanical,
G01P 3/36 optical,
G01P 3/42 electric or magnetic,
B60W 10/10 conjoint control electric vehicles including change-speed gearings,
B60W 10/101 infinitely variable gearings,
B60W 50/038 limiting input power, torque, or speed,
B60W 10/111 with separate change-speed gear trains arranged in series
  Classifications—USPC:
  901 Robots 19 Drive system for arm
  901 Robots 20 altering speed of driven element
    Related or Referencing:
  901 Robots 21 flaccid drive element
  901 Robots 22 fluid motor
  74.640+ gearing 475 planetary gear
  74.640+ gearing 25 Gearing*
  74.640+ gearing 26 bevel gear
  74.640+ gearing 27 arm part (74.469+)
  74.640+ gearing 28 joint
  74.640+ gearing 29 wrist
  74.640+ gearing 32 servo-actuated (9 sensor feedback loop, 46 sensing devices usable with robots),
  74.640+ gearing 33 tactile sensor,
  74.640+ gearing 34 force feedback,
  74.640+ gearing 35 proximity,
  74.640+ gearing 36 actuating means (19+ motors which drive robotic arms),
  74.640+ gearing 37 fluid motor,
  74.640+ gearing 45 compliance,
  74.640+ gearing 49 protective device
    Reference:
  B60L certain electric equipment of all electrically-propelled vehicles

BACKGROUND OF THE INVENTION

Complex robots such as humanoid robots are currently not available or feasible for most purposes. Existing methods result in robots that tend to be one or more of the following: very expensive, heavy, dangerous, weak, slow, clumsy, too large, too small, not easily reconfigurable, hard to maintain, hard to manufacture, difficult to prototype and develop on, and unaesthetic. This is accepted as the status quo; most assume that it is a lack of workable applications or manufacturing scale that is holding us back. Most new robots use the same few approaches to joint actuation, for example refining brushless DC (direct current) motors but not questioning whether a fixed high-ratio harmonic drive transmission is the best solution for every new robotic joint.

With respect to background, attention is directed to U.S. Pat. No. 8,251,863B2 which describes certain areas of robotics background that are substantially relevant to this transmission and robotic power distribution system. With respect to the solution in U.S. Pat. No. 8,251,863B2, the substantial amount of solid metal leads to disadvantageous weight to performance ratios; the form requires a certain bulky shape. The ratio control mechanism seems to require substantial operating force. It would be difficult to make a more flat embodiment.

With respect to patent PCT/FR2017000174, the design is typically large for belt style CVTs (continuously variable transmissions) while using a new mechanism that seems weak and problem prone. Not easily used in a robotic joint solution.

With respect to U.S. Pat. Nos. 761,384, 954,977, 9,481,244, the techniques, materials, and controls are no longer relevant, competitive, or useful while the core idea is still used today in various forms. No use is known of current use for robotics applications.

With respect to patent 20140179478, this patent is indicative of a wide range of continuously variable transmissions for bicycles and similar moderately lightweight use which is somewhat similar to robotic joint scenarios. These types of designs would not easily provide the minimized physical size and weight needed, would not shift fast enough to be useful, and would be difficult to use overall.

With respect to the Pinion P-Line, C-Line (patents certainly filed, but not yet found), the inventions and designs represent a good example of a multi-gear transmission with rapid shifting. These types of transmissions are not continuous, a requirement for effectively controlling robotic joints, only practically support a small range of gears, and, as in many cases, shifting requires momentary interruption of driving force.

With respect to U.S. Pat. No. 5,071,394, this is indicative of many CVT designs: technically functional but not practical due to the bulky, complex, heavy nature compared to control and output capabilities.

With respect to U.S. Pat. No. 8,512,195, Fallbrook Technologies CVTs similar to this design are commercially sold as bicycle transmissions and as a transmission for trucking industry auxiliary power units. Fallbrook has disclosed that this general design can be configured as a reversible IVT (infinitely variable transmission). This design is usable in a certain range of situations, but suffers from extreme manufacturing tolerance requirements, weight from both amounts of solid metal and the requirement of a fluid-filled operating compartment. It also likely requires significant force to shift with shifting likely being too slow for robotics applications. Additionally, there is no modulation of friction, compliance, or slip.

With respect to the SRI Inception Drive (patent certainly filed, not yet found), this design is indicative of a wide range of continuously variable transmissions that may work but are overly complex and seem to have weak performance characteristics. This transmission is designed to have a high ratio, similar to a harmonic drive transmission, not suitable for certain uses due to the high RPM input needed.

With respect to Guigan Rack transmissions (patents certainly filed, not yet found), these methods provide for a CVT or IVT (down to infinite, but not usefully to negative ratios) that are not principally friction based. Although the freewheel can be a friction device, the geared pinion is the primary force delivery mechanism. While reciprocating and related or part of the ratcheting class of CVTs, this ratcheting aspect is momentary and can be ameliorated in various ways. Integrated friction modulation and similar compliance characteristics are not possible without further additions. The reciprocating momentum acceleration costs may be significant.

With respect to Moore et al. 1999 Design of a 3R cobot using continuous variable transmissions, this paper discusses cobots, a spherical ball-based CVT with 2 inputs, and series and parallel connection of CVTs. There is no discussion of a tree or graph of CVTs, or any discussion of IVTs. In fact, the "CVT" and "continuously variable transmission" purported in this paper, is not a continuously variable transmission as that term is now used nor how it is used in this work. It is in fact a two vector summing device, each spherical element driven by two electric motors or through indirect driving via another spherical element in the system. A vector sum device can be useful where the "wheel" of a robot is a sphere, but not generally useful for the full range of robotic joint construction.

With respect to Quigley et al. 2011 A low-cost compliant 7-DOF (degree of freedom) robotic manipulator, several strategies and methods are disclosed for a relatively low-cost, lightly complex, usable workload, human-safe robotic arm mechanism with good repeatability, small backlash, and reasonable speed using commercial servos. This document notably discloses a simple elastomer-based series compliance mechanism. This does not solve the problems encountered in scaling this up to more power, less weight, and the greater complexity of something like a humanoid robot. The servos are necessarily at a single gear ratio, limiting the dynamic range of operating capability. The weight of the servos, distributed along the arm, reduces useful working capability.

With respect to A Review of Dynamic CVT-IVT Transmissions & Continuously variable transmission, these references catalog the known forms and characteristics of CVT and IVT transmissions.

SUMMARY OF INVENTION

This solution is aimed at solving all of these issues, enabling robots that are effective while being drastically less expensive, lighter, more energy efficient, able to provide dynamic power/speed tradeoffs and mode changes, and generally encouraging rapid prototyping, development, evolution, and commercialization of useful robotic solutions. Rather than relying on extreme precision and advanced industrial scale manufacturing to work at all, workable versions of certain embodiments can be mostly 3D printed, injection molded, or otherwise produced in small runs or individual exploration.

Definitions

Brake: A Brake is any mechanical or electromechanical element that holds a rotating, translating, or circulating element or fluid. Brakes may be static or holding, where they hold a stopped position, or dynamic have the ability to slow a load. Brakes may be normally open, non-restricting or normally closed, clamping, using some form of intrinsic pressure that must be held off in normal or active movement operation. The holding torque of certain gears, including but not limited to a worm gear, provide an intrinsic braking or one-way clutch effect when the driving gear is not being driven. An eddy current brake can slow a quickly moving element, but not stop or hold movement like a friction, locking, or active brake. An active electromagnetic brake can slow, stop, and hold a moving element while energized, in some embodiments used in conjunction with a locking element to allow de-energization with continued holding.

Controller: One or more mechanisms that effect control of the ratio modulator, slip modulator, any brakes or clutches, and receive data from sensors or motor feedback about the state of the device. Most embodiments use the use of one or more microcontroller computer chips and ASICs assemblies, or other active device communicating via wireless, wired, optical, via audio, or magnetically with each device, actuator, or sensor. The controllers communicate with the active upstream or peer controller or computer in an overall system. Communication between controllers and any higher level computer or communication link is through linkages comprised of one or more of electric wires, fiber optics or LEDs or other direct or indirect (such as unfocused LED signal) optical links, radio communication including without limitation BlueTooth, Zigbee, WiFi, magnetic, or audio signals. In the case of configuring the system for harsh or particularly stringent environments, such as avoiding metals, the controller, the slip or ratio modulator motors, or any other component may be remotely located, perhaps using a shared or conjoined structure, so that the function is remotely connected via belts, cables, drive rods, fiber optics, or other means of remotely effecting movement, control, or sensing.

CVT: Continuously variable transmission, any device that takes input power, including, without limitation, rotational torque or hydraulic pressure or flow, plus a modulating control input or operating pressures, and produces a variable ratio output that various continuously over some positive range with control input.

Free Gears or Gearing or Geared: Any combination of gears or gear-like mechanical or other power transmission mechanism allowing back driving including, without limitation, spur, pinion, helical, bevel, crown, hypoid, and other common gears; friction-based elements such as wheels, disks, or cones; hydraulic, flexible, universal or other jointed, belt, cable, chain, or rotational cable, fixed or flexible rod, tube, or cable.

Gears or Gearing or Geared: free gears or blocking gears.

Hydraulic or hydraulics: All uses of hydraulic or hydraulics and related systems are also defined to include pneumatic and other fluid, gas, and gel actuated mechanisms that are equivalent or similar in function.

IVT: A CVT which ranges from a small positive ratio of input to output (e.g. 1:1, 1:0.2, 1:10) to an infinite ratio of input to output (infinity:0), reaching stopped output. Some IVTs are intrinsically cable of a smooth range into negative ratios, reversing direction of the input. Some IVTs operate diminished in some way near or at stopped or in reverse.

RIVT (reversible infinitely variable transmission) Assembly: The combination of a CVT with an assembly of gears and linkages that result in an RIVT between an input shaft and output shaft. This assembly comprises a gear train that: splits the input power by gearing to two rotating shafts, one shaft as input to the CVT/IVT, the other connected to a fixed ratio gear train (e.g. via 2 spur or bevel gears) then combined with the output of the CVT/IVT through the use of a two-input one-output planetary gear or other power summing device with gear ratios chosen so that the range of the CVT/IVT produces a desired RIVT range (e.g. 1:−2 to 1:4 or 1:−10 to 1:10). For example, a CVT may have the range 1:1 to 1:4; the fixed gear ratio path might be implemented at 1:2; the RIVT output for the midpoint setting for the CVT would then be 1:2-1:2=0, i.e. powered stop at an infinite ratio; 1:1 might be fast reverse at 1:−2 while 1:4 would be fast forward at 1:2. This assembly can be constructed by those skilled in mechanical engineering with various gear ratios, gear types, and linkages to meet performance and packaging goals.

Linkage Shafts or Joint to Joint Linkages: In cases where fewer motors are used than transmissions, mechanical power is transmitted through common methods including circulating or reciprocating belts and cables, rotating or reciprocating shafts, or hydraulic pump+motor systems such as a swash plate pump+motor. These linkages can be flexible, with universal joints and frame supports as needed to support ranges of motion. In one embodiment, without limitation, electric power, for the transmission slip and ratio actuators and the controller, and communication wires to the controller if desired, are integrated into the linkage shafts and would use an innovative docking and locking shaft endpoint and transmission socket.

Motor: Any device that outputs physical movement, rotary or translatable to rotary by methods known by those skilled in the art of mechanical engineering & robotics. Embodiments include, without limitation, fuel powered combustion engines or electrochemical, electric, hydraulic, compressed gas reciprocating motors, any type of turbine.

One-Way Bearing: A One-Way Bearing, aka Clutch Bearing or One-Way Clutch Bearing or Anti-Reverse Bearing or Sprag Clutch or One-Way Vale or Check Valve, is, without limitation, any mechanical or electromechanical component added to a rotating, translating, or circulating member to prevent rotation in one direction with very little friction or impedance in the other direction. The mechanism may be based on sprags, ratcheting, ball or pin bearings with ramped channels, or friction elements.

Output wheel assembly: The output wheel assembly is everything described in the RIVT definition starting with the output wheel and supporting mechanisms through the output shaft including the two-input one-output planetary gear or other power summing device which makes the CVT into an RIVT.

Proprioceptive sensor array: A robotic sensing system machine analogue of the human proprioceptive senses along with related senses that naturally we integrate. This machine analogue senses and reports to the controller the position of joints, limits, motion, strain, vibration, slip, plus feedback required for compliant, cobot, or safety purposes and operation. Proprioceptive sensing is comprised of sensing of the rotation speed and position of input, output, slip modulation, and a spring coupler or other twist measurement mechanism. A variety of sensing mechanisms are alternative embodiments, including reed switches, digital cameras, integrated gyro chips, powered with inductive coupling (similar to VHS player rotating heads) or modulated wireless power or light or capacitance with intermittent electrical connection, or reflected light. In one embodiment is sensing of modulator motor feedback, reed or Hall effect switches, and one or more LED illuminators coupled with several IR sensors multiplexed with one or more analog-to-digital converters (ADC). Additionally, ridges, spirals, and other prominences are added to rotating components; mirrors and light blocking panels or prominences will be used as necessary to guide source lighting to pathways toward physical measuring features colored, applied, molded, cut, or melted into features on each sensed element. The specific sensing points are: input power shaft, output power shaft, slip actuator position, and ratio actuator position. The sensed or computed attributes for each of these sensing points are: rotation speed, torque, rotation angle, and rotation count. Additionally, the controller will use available inertial, gyro, magnetometer, and vibration sensing peripherals, in addition to coordinated sensing communication with other controllers in the hierarchy/network, to estimate pose, travel, and relative and absolute position of the transmission.

RIVT: A Reversible Infinitely Variable Transmission (RIVT), a subset of CVTs and IVTs, is an infinitely variable transmission that ranges continuously based on control input from a negative, reverse, ratio, through infinite ratio at a powered stop position, to some positive ratio. This may be intrinsic to the IVT mechanism or achieved by adding an RIVT Assembly. Some embodiments include one-way input clutches, locking (static) or non-locking (dynamic) brakes, and may have a reversible or non-reversible nature. This is not to be confused with some published uses of Reverse IVT meaning to back drive an IVT. An RIVT is normally able to be back driven unless a one-way bearing is added. For the purpose of definition and as a valid variation, particular RIVTs may be configured to have any range of ratio, potentially lacking any of positive, negative, or zero/infinite ratios; the design supports a range of negative to positive ratio which may not be needed for a particular application.

Ratio Modulator: Through inputs from the controller and return signals and signals to the controller, a mechanism for controlling, directly or indirectly, the ratio between the input and output CVT elements through use of an active physical mechanism such as, without limitation, a piezoelectric or ultrasonic or stepper or gear motor coupled directly or to a worm gear or other back drive or creep resistant mechanism, electrical or other solenoid, ratchet, control rod or cable or other firm or flaccid control linkage coupled to a worm gear. The action required to modify the ratio varies with each CVT/IVT implementation mechanism. In wheel on disk, wheel on dual disks, and wheel on dual cone, the position of the wheel on its axle determines where the contact point or points are which, due to the relative effective size of the disks or cones at that point, determines the ratio. In these cases, a fork or similar mechanical mechanism, using bearings including self-lubricating material plain bearings, guides and restricts the output wheel's position on the disk. In another embodiment, the ratio modulator turns the wheel slightly in the intended position of travel so that the rotation of the disk will cause rapid lateral travel until the modulator straightens the wheel with respect to the perpendicular of the disk centerline.

Robot and Robotic: In addition to common definitions of Robot and Robotic, for this patent these terms additionally refer to solutions and uses that involve, without limitation: multiple coordinated rotating, linear, twisting, orthogonal, or revolving joints, or wheels, propellers, legs, tentacles, multi-jointed or multi-segmented arms for a robotic, vehicle, or air/land/water/ice/space drone.

Robotic Power Distribution System: The robotic power distribution system described in claim 11 and in this specification supports operating modes with fewer motors than transmissions, down to a single source of rotational power running any number of robotic joints up to the limits imposed by cumulative friction and other losses. This innovation allows for energy savings through fewer larger, more efficient motors, running more consistently in one direction while avoiding frequent starts and stops, the ability to route power from one or more motors to one or more places where it is needed most. This integrated operation network coordinates the control and sensing for the controller that is part of each transmission, including speed, torque, slip caused by compliance or over pressure, position, and orientation. Providing all of this in a standardized way, using standardized connection ports, mounting and size tiers, and allowing easy maintenance, provides significant improvement to many existing and newly feasible situations.

Self-locking Gears or Gearing or Geared: Any type of gear or gear-like mechanical or other power transmission mechanism or combination of mechanisms that transmits substantially only in one direction, including, without limitation, worm gears or drives, gears combined with freewheels or other one-way clutch, sprag, or other mechanical elements; diodes, check valves, and pinch rollers or equivalent.

Shaft or Rod or Rotating Linkage: A solid or hollow connecting element rigid enough to carry the desired rotational torque withstanding shocks and vibrations of any cross-sectional shape. In one embodiments include a hollow metal, plastic, or ceramic tube with a circular, square, or other convex polygon such as hexagonal. Those skilled in the relevant engineering, design, and manufacturing arts will choose the most optimal shape for each application. Some shafts are pure point to point linkages while others have sliding power coupling wheels or similar riding perpendicular with the shaft through the center hole. These power coupling wheel linkages employ, without limitation, bearings, including plain bearings, and may use a shaft with a shape that supports efficiently the wheel sliding along the shaft while delivering or receiving rotational power to or from the shaft respectively. In many embodiments for this also include use of a square or hexagonal shaft or a round shaft with grooves for bearing surfaces. One embodiment for bearing linkages include, without limitation, the use of self-lubricating plastics and metals or roller bearings for each face or corner of the shaft cross-sectional shape, including a plurality of groove surfaces as needed to achieve low sliding friction.

Slip Modulator: Through inputs from the controller and return signals and signals to the controller, a mechanism for controlling, directly or indirectly, the friction and slip threshold between the input and output CVT elements through use of an active physical mechanism such as, without limitation, a piezoelectric or ultrasonic or stepper or gear motor coupled directly or to a worm gear or other back-drive/creep resistant mechanism, electrical or other solenoid, ratchet, control rod or cable or other firm or flaccid control linkage coupled to a worm gear. In addition to slip compliance of the actuator, modulation of a series elastomer or spring provides an additional embodiment. How the slip is modulated is particular to each CVT/IVT mechanism. In wheel on disk, wheel on dual disks, and wheel on cones, the relative distance between the wheel and the disk or disks or cones is modulated by moving the wheel axle or one of the disks/cones. One embodiment uses a pair of threaded rod actuators; another would use a hinge and a single threaded rod.

Slip Modulated: Integration and use of a slip modulator in an RIVT assembly.

SPIVT (Slip-modulated Proprioceptive Infinitely Variable Transmission): An instance of this transmission comprising an RIVT, or CVT plus RIVT assembly to create an RIVT, a slip modulation assembly, a ratio control assembly, and optionally one or more position/speed/torque/orientation/ sensors, plus a controller for controlling slip & ratio, sensing, and communication with other SPIVTs and any controlling or coordinating computer system of one or more computers or communication links.

Wheel on disk friction drive: A wheel on disk friction drive is a type of CVT where an output drive wheel with a elastomeric or otherwise compliant high-friction edge, rides on and perpendicular to an input power disk with a flat, hard surface that develops high friction with an elastomeric or otherwise compliant material. The wheel is carried on an axle so that it can be moved along the axle while imparting a rotational force to it. The directional of travel is normally along a line from near the edge of the disk toward the center point. This is similar in principle to the Lambert 1904 & 1910 friction-gearing disk drive transmission, used in early automobiles and locomotive transmissions, and more recent riding lawnmower, tractor, and snow thrower transmission units that use the same principle. Here, the mechanism is altered in several ways to suit modern additive manufacturing, sintering, injection molding, and composite construction, and through the use of modern elastomers and shapes for the friction wheel and surface materials and textures conducive to optimal operation. Embodiments include carbon fiber filled nylon additive printed disk and wheel, with polyurethane or similar elastomer with a Shore A durometer of 70-100, and an aluminum plate adhered to the drive disk friction surface. A slip modulator controls the position of the axle and output wheel assembly relative to the input disk to control contact and amount of pressure and deformation of the elastomer against the disk. This controls whether the transmission is disengaged (neutral) or connected, and at what point torque will overcome friction to cause slippage. Slip can be desired in a number of cases, including robotic compliance, safety limits, and absorbing momentary shocks. A ratio modulator controls the position of the output wheel relative to the input disk while riding on and imparting rotational force to the output axle. An alternate embodiment variation has dual wheels on the same axle on opposite sides of the input disk, doubling the torque limit. Another desirable alternate embodiment variation has a plurality of output wheels at different radials on the disk, with different sized wheels or using axles that do not cross the midpoint of the input disk or axles that all terminate into a central hub above the input disk. These output wheels can be coupled to the same or different outputs. For multiple wheels with the same output, the plurality of output wheels could be used to multiply the torque limit or to support quick changing from one ratio to another or to support larger ratio ranges than a single disk width will allow. Multiple outputs allows multiple output ratio independent outputs in an efficient, compact form, subject to a shared input disk speed. Wheel on disk, wheel on dual disk, or wheel on dual cone friction drives has a surface that can have combinations of smooth, textures of various types, texture in bands, or drop outs (lowered or absent sections) in one or more bands, in some cases with features to enable on and offloading of the drive wheel to avoid getting stuck in the channel. These surface features can be used for exceptional handling in case of moisture slippage or to add haptic or other vibration or to increase or decrease or otherwise change frictional characteristics, including a neutral mode. To allow for thin construction of the input disk and other elements, and the use of plastics or other material less sturdy than steel, support rollers and bearings can be added, such as the non-friction surface side of the input/output disks.

Wheel on dual disks friction drive: A wheel on dual disks friction drive is an extension of the wheel on disk friction drive where there is a second disk, used as output, which is placed opposite the input disk where 1/2 of each disk overlaps with the center point of each disk being near the edge of the other disk. The wheel or wheel assembly rides between the disks. This multiplies the ratio range compared to a fixed wheel on disk. In this case, normally the wheel becomes an idler wheel, eliminating the need for output drive coupling with its axle. To allow the slip modulator to function, either the disks are at an angle from each other, so that the wheel can travel toward the wedge, or a wheel assembly can adjustably bridge the gap between the parallel disks in an adjustable fashion. One embodiment variant for this would be a pair of linked wheels where one can be raised or lowered relative to the other; or the wheel could twist relative to vertical relative to the dual disks; or the slip modulator could control a clutch in the coupling between the two wheels.

Technical Problem

Existing robots are expensive to manufacture, operate, and maintain, heavy, use a lot of power, often have poor operating torque/speed tradeoffs, have weak sensing abilities, are not standardized in any broadly useful way, are not available in richly capable form for a reasonable price for most developers, and are often intrinsically dangerous. There are few situations where these characteristics lead successful deployment of robots. Well-funded factory robotics and certain other narrow applications, such as warehouse merchandize pick & place and transport, are some of the only working examples. Interesting artificial intelligence (AI), machine learning (ML), augmented reality (AR), virtual reality (VR), haptics, controllers, human pose sensing, and other technologies have progressed significantly, yet available robotic hardware is mostly out of reach, too dangerous, or otherwise inappropriate for many interesting cases.

Solution to Problem

By relaxing some common assumptions about 1 motor+1 transmission or more per joint/actuator and precision requirements, compensated for by other design elements and innovations, combining some neglected and new methods in innovative ideas, this transmission and robotic system adds significantly to the available design space for robotics. This transmission integrates the fundamental components needed for an effective modular networkable proprioceptive robotic joint actuator, with or without a proximate motor.

Embodiments using wheel on disk friction drives can be made extremely lightweight, and various sizes and form factors including very small and compact, while still powerful enough to do useful work. This contrasts with most alternatives which are nearly always bulky, dense—often consisting of solid balls, bearings, sturdy housings, are sometimes fluid filled, are practically available only at a very small number of sizes, or they are weak, operate at fixed ratios, require a high rotation speed input, involve lots of rapid and expensive starts and stops of heavy elements like motor armatures, and they are often expensive.

Advantageous Effects of Invention

This transmission and robotic system enables a wide range of feasible uses for complex robotics, including humanoid, factory customizations, and designs like pack animal. This is accomplished by improving the economics, flexible design of robotic joints, combinations of joints, and overall power distribution in a complex robot, including the ability to power an entire robot effectively and efficiently with as little as a single motor.

With the graph of SPIVTs embodiment, several optimizations of a robotic system may be achieved: A larger, more continuously running motor may be more efficient than many smaller motors that start, stop, and reverse frequently, even with physical force linkages. The weight of a SPIVT can be drastically minimized, often inexpensively, in a variety of ways while motors remain either expensive and power hungry or heavy; avoiding or centralizing weight can have a multiplicative improvement on overall efficiency as much closer to the working weight is borne by outstretched arms etc. In some SPIVT embodiments, construction can involve easy one-off methods, such as 3D additive manufacturing plus a few off the shelf hardware; this can be highly advantageous compared to high-precision machining designs which are expensive, economically available only at a small number of sizes and configurations, and hard to customize for small markets.

Illustrates the elements of one embodiment of a SPIVT in a compact configuration, using a wheel on disk CVT and including an embodiment of a low-cost proprioceptive sensing network using one or more LED, light or camera sensors, along with mirrors, light guiding and blocking physical features, and detectable surface features.

Figure 2:
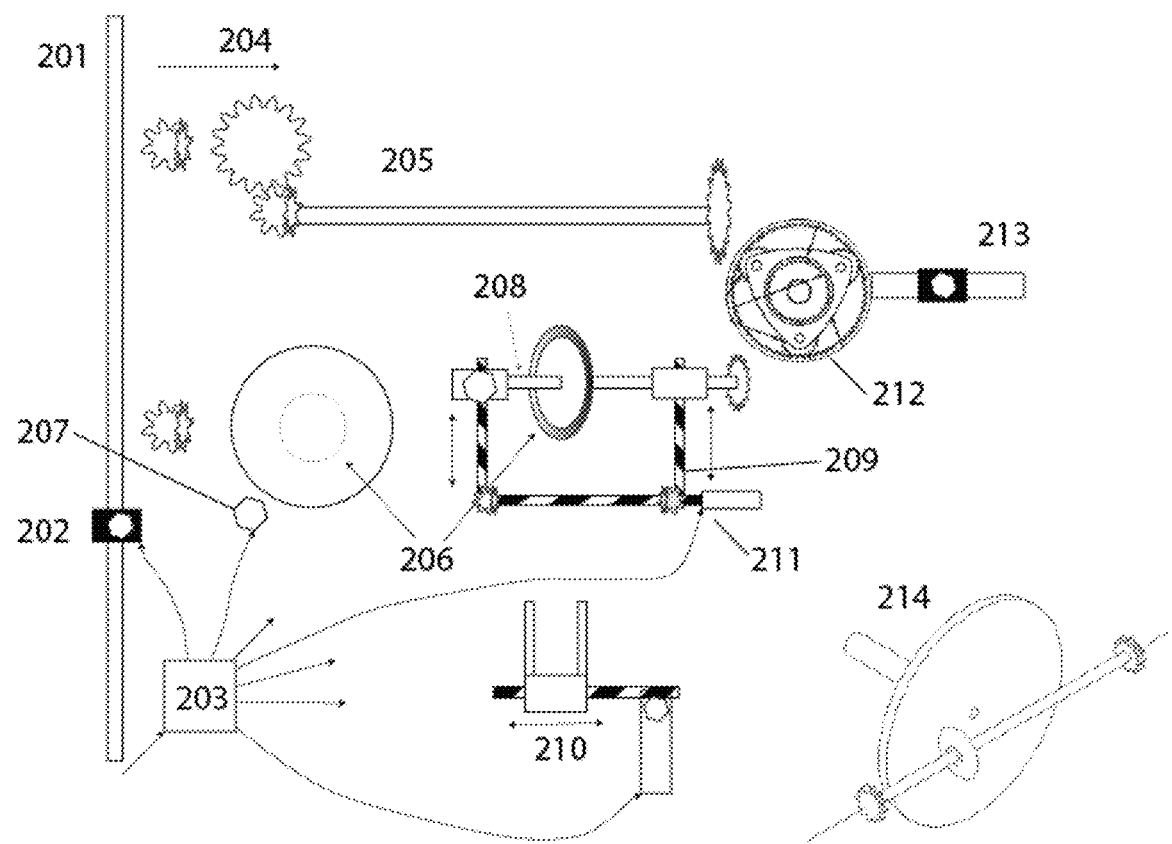

FIG. 2 SPIVT Block Diagram—Single Disk

Illustrates a SPIVT, using a wheel on disk CVT, as a block diagram.

Figure 3:
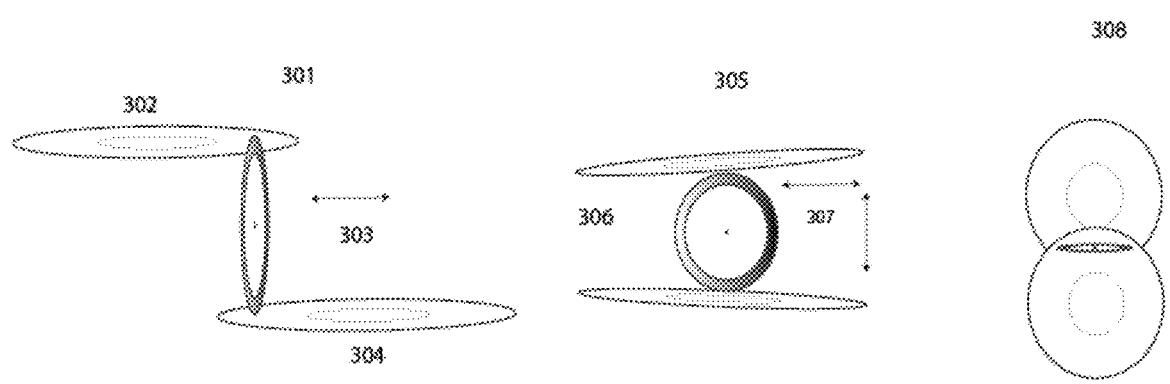

FIG. 3 SPIVT Block Diagram—Dual Disk

Illustrates embodiments of a dual disk CVT to be comprised by a SPIVT.

Figure 4:
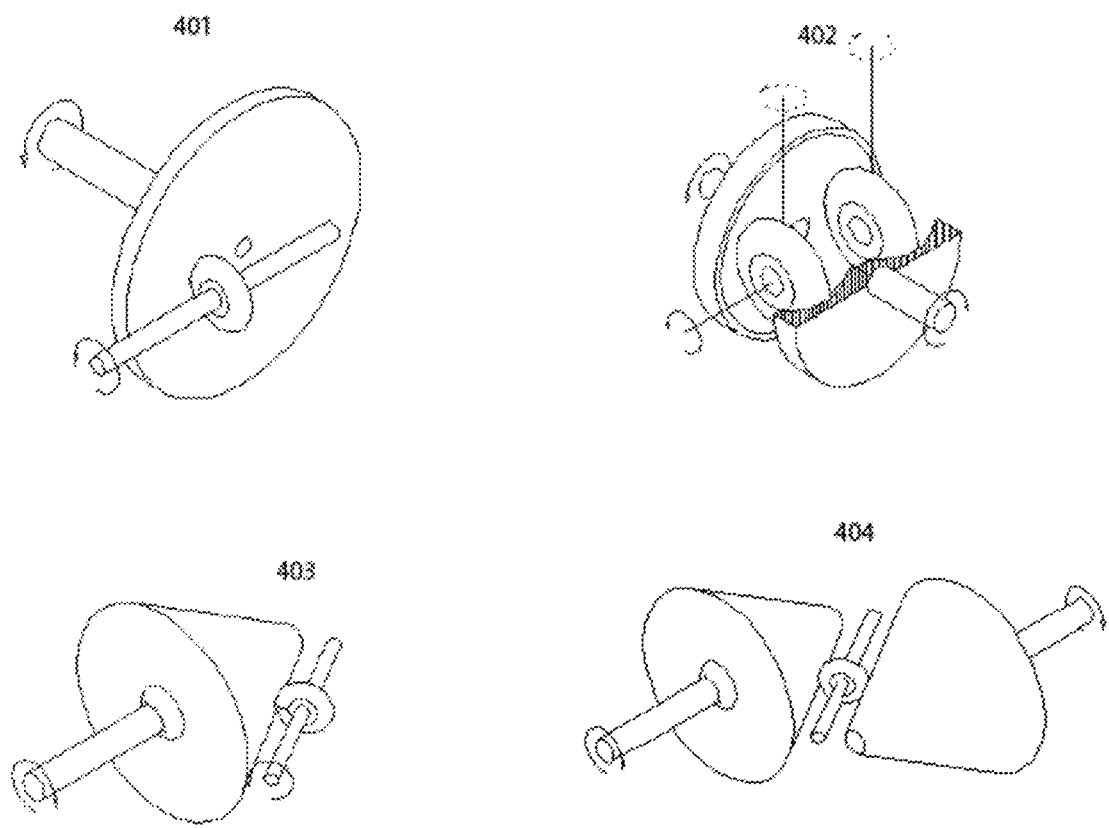

FIG. 4 SPIVT Variations

Illustrates a subset of the alternatives and variations of SPIVT pairing and construction.

Figure 5:
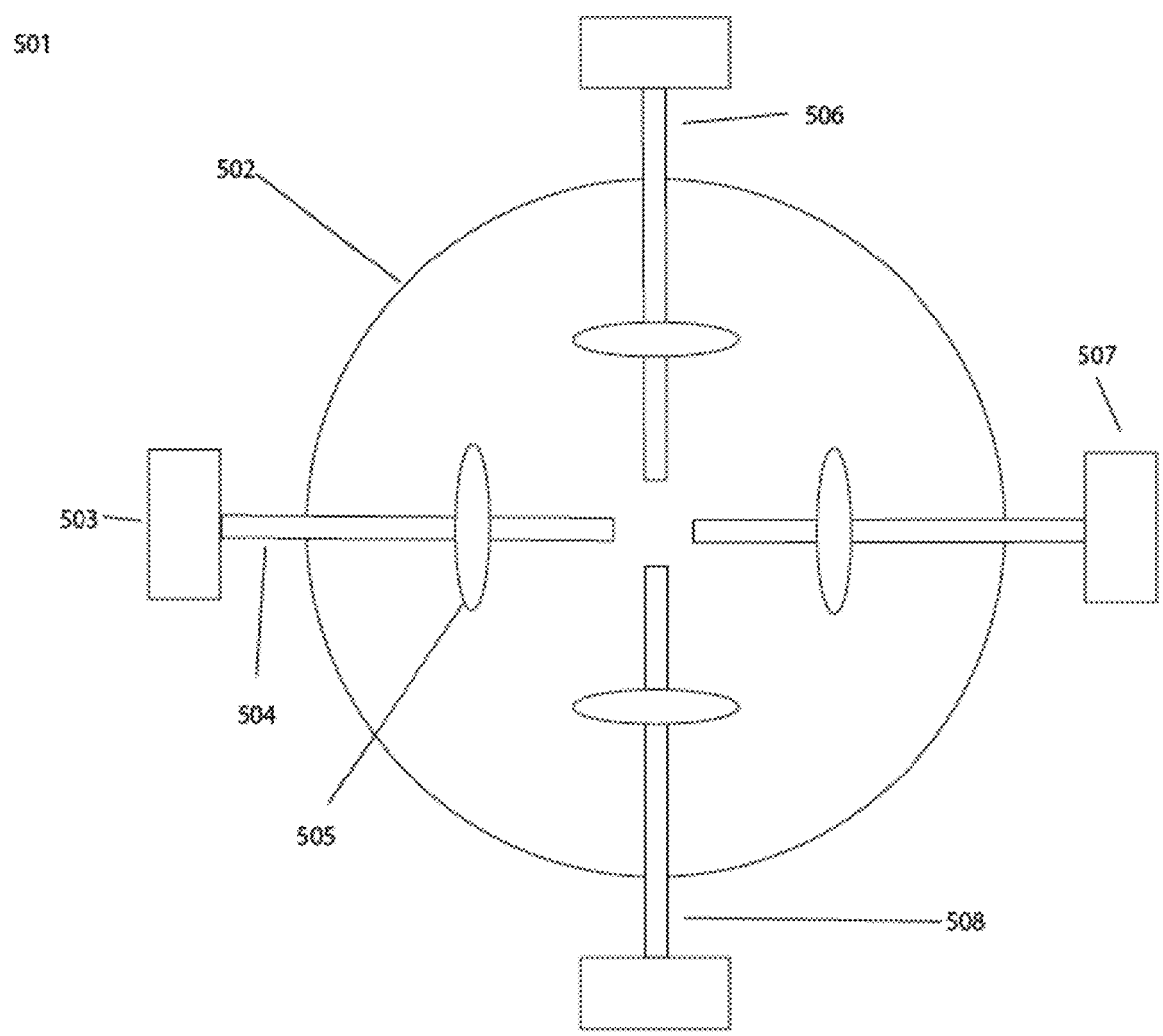

FIG. 5 Wheel on Disk multiple CVT integration

Illustrates a subset of the alternatives and variations of combining multiple CVTs in a wheel on disk CVT to create multiple RIVT outputs.

FIG. 6 SPIVT Graph

Illustrates a subset of the alternatives and variations of a connected SPIVT graph.

DESCRIPTION OF EMBODIMENTS

In the example illustrated in the accompanying figures, and described in detail in this specification and below, a CVT is combined with an RIVT assembly gear train to create a reversible infinitely variable transmission (RIVT) with an output suitable for directly or indirectly driving a robotic joint load and/or connection to the input of one or more SPIVT transmissions, along with a slip modulator, a ratio modulator, a controller communicating with a wider computer & SPIVT network, and a proprioceptive sensor array to create a slip-modulated proprioceptive infinitely variable transmission (SPIVT) with advantageous characteristics. A SPIVT may directly use any friction-based CVT where that friction/traction interface can be modulated by the addition of a slip modulator; or if the CVT is not friction-based or cannot feasibly incorporate a slip modulator directly, a separate slip modulator controlling a slip element, such as an actuated friction clutch, band brake, or hydrostatic or eddy current coupling, may be added to achieve this function. In addition to remote operation options via cable, belt, rotating drive rod, hydraulics, or pneumatics, the motors in the slip and ratio modulators may be any controllable movement mechanism, including small electric gear motors. As the function of these motors generally involves small, low-power movements, the power needed to run them is small and a number of compact, very inexpensive options, such as gear motors plus a worm drive, are available in addition to sophisticated precision options such as piezoelectric, ultrasonic, or hydraulic options. In some embodiments, nearly all of the power needed may be derived from the rotating input shaft through gear trains coupled with a clutch or other mechanism, allowing high power for fast movement controlled by much less electricity. Requirements and design envelopes vary greatly, even within a single robot, such as a high-fidelity humanoid robot. A specific SPIVT type can be designed and optimized for a wide variety of sizes, shapes, capabilities, combinations for multiple outputs and other purposes, power, and speed/torque ratios, along with choices for CVT type, sensors, freewheels, and brakes. Each SPIVT, via the integrated controller, forms a network with other SPIVTs and any controlling computer systems or communications links.

A SPIVT is operated by a controlling computer directly or indirectly communicating commands & goal states with the controller; said controller continuously monitors all available information about slip and ratio modulator position and pressures, speed, position, strain, torque, attitude (pitch, roll, yaw), direction (compass heading etc.), and relative positioning when known; using both this information and active commands and goals, the controller coordinates with any other SPIVT controllers and related computer systems found to be relevant to the required operation; after agreeing on a movement strategy, the controller makes a step toward the goal according to the ramp/hold plan selected; at frequent periods, the controller adjust parameters to continue seeking the current goal, adjusting for errors in expected trajectory of its own and other SPIVT positions.

This network of SPIVTs coordinates movement and integrates distributed proprioceptive sensory information. By connecting the outputs of one or more SPIVTs to the input of other SPIVTs rather than using additional motors, a graph of SPIVTs distributing physical power is created. This group is normally a one-way hierarchy, but in embodiments without one-way clutches on input shafts and using CVTs that can be back driven, power distribution can be bidirectional. This can be useful to avoid having a larger motor, instead using a number of smaller motors whose output can be pooled to achieve the desired power needs at one or more SPIVT. This can include passing this extra force through the shaft of a motor: a humanoid robot may have an upper torso motor and a lower torso motor, connected with a SPIVT normally configured so as to allow the motors to operate at some relative speed so that they don't interfere with each other. If one of the motors begins to reach the limits of its capabilities, the adjoining SPIVT can be shifted to a ratio that will allow power from the more idle motor to flow to support the straining motor. This can be achieved at any point in the SPIVT/motor graph. In addition to direct joint outputs, stiffness members can be tightened as an additional output of nearby SPIVTs. Both of these approaches are somewhat analogous to tensing abdominal muscle groups to connect lower body musculoskeletal systems and muscle to upper body musculoskeletal systems to throw a ball or lift a weight.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

EXAMPLES

These are non-limiting embodiments illustrating single design points in the range of features, configurations, construction materials, and uses covered by this patent.

Example 1

Humanoid Avatar Robot: A robot with roughly human dimensions and capabilities, able to be used effectively for human tasks including through remote teleoperation. A robot having 20-40+ degrees of freedom (robotic joints), a humanoid robot designed for remote teleoperation+AI control, and when technology permits, full AI control some or all the time. This robot comprising a hierarchy or network of transmissions of this transmission (SPIVTs), driven by one or more battery powered motors, where SPIVTs without their own motor receive mechanical power, low-power electricity, and signals via one or more types of shaft linkages. The particular shaft linkages chosen for this application will be based on the demands of the human form: The torso to hips to legs to knee to feet links each have different ranges and speeds of motion, power needs, and frequency of use. The torso to shoulders, elbows, hands, neck, head, and face have much different characteristics. This includes many individual joints for human-like wrists, hands, and facial motions. Each linkage can be chosen according to optimal matching of these characteristics. The outputs of SPIVTs will sometimes drive joints directly, without additional gearing, and at other times operate belts or cables some distance away using common robotic methods. Target price, desired durability, endurance, precision, and performance characteristics will vary widely. Target price of units will vary, including low end units requiring price points far less than existing devices and methods would allow.

The development unit is a customizable platform of replaceable limbs, linkages, and SPIVTs, allowing additive manufacturing, casting, composites, or other methods where standardized mount points are easily created using molds or pre-formed modules. SPIVTs of various sizes and configurations can be reused easily.

Example 2

Humanoid Art Car and large scale prototype: A robot in the range of 5-10 meters tall, driven by a single gas engine in a harsh environment with limited durability needs. Needs to be lightweight for size, able to carry at least one human passenger safely, easy to assemble and maintain, and use minimal energy to allow long operating periods.

Example 3

Robotic dog: Able to walk, run, articulate head and manipulator jaws, tail for balance. One or two motors power a hierarchy of SPIVTs to effect all motion with efficient use of weight allowance and power. A load-bearing unit may use multiple motors and SPIVTs with steering movements, head, and tail run off of extra outputs or one or more fine movement SPIVT with multiple outputs.

Example 4

A hexapod robot with a single electric motor driving a single SPIVT with a plurality of outputs for each leg for adduction, abduction, and lateral angle. Plus driving additional outputs for a manipulator arm.

Example 5

Factory Automation: A custom factory robot is quickly assembled from standard parts based on reach, number of limbs, segments, end effectors, and power ratings desired. One or more motor units supply shaft linkage connections from one or more arrays of mounting points of one or more sizes and capabilities. Once installed, the SPIVTs are activated, synchronized, and are used as a system to accomplish the factory automation task. Using slip and compliance modulation, the integrated proprioceptive links, provide compliant operation around humans, and cobot guidance and programming capability, while able to provide fast, powerful, precise operation based on a closed feedback loop.

INDUSTRIAL APPLICABILITY

This transmission and robotic system expands the range of feasibility for the use of robotics in factory settings, in and around humans, in disaster relief operations, dangerous situations including fire, radiation, and explosion hazards, and in rapidly creating new types of robotic machines. Advancements include improved modularity, design flexibility for size, speed, power, ganging of individually controllable outputs with shared elements, and the potential for extreme cost optimization.

REFERENCE SIGNS LIST

Figure 1:
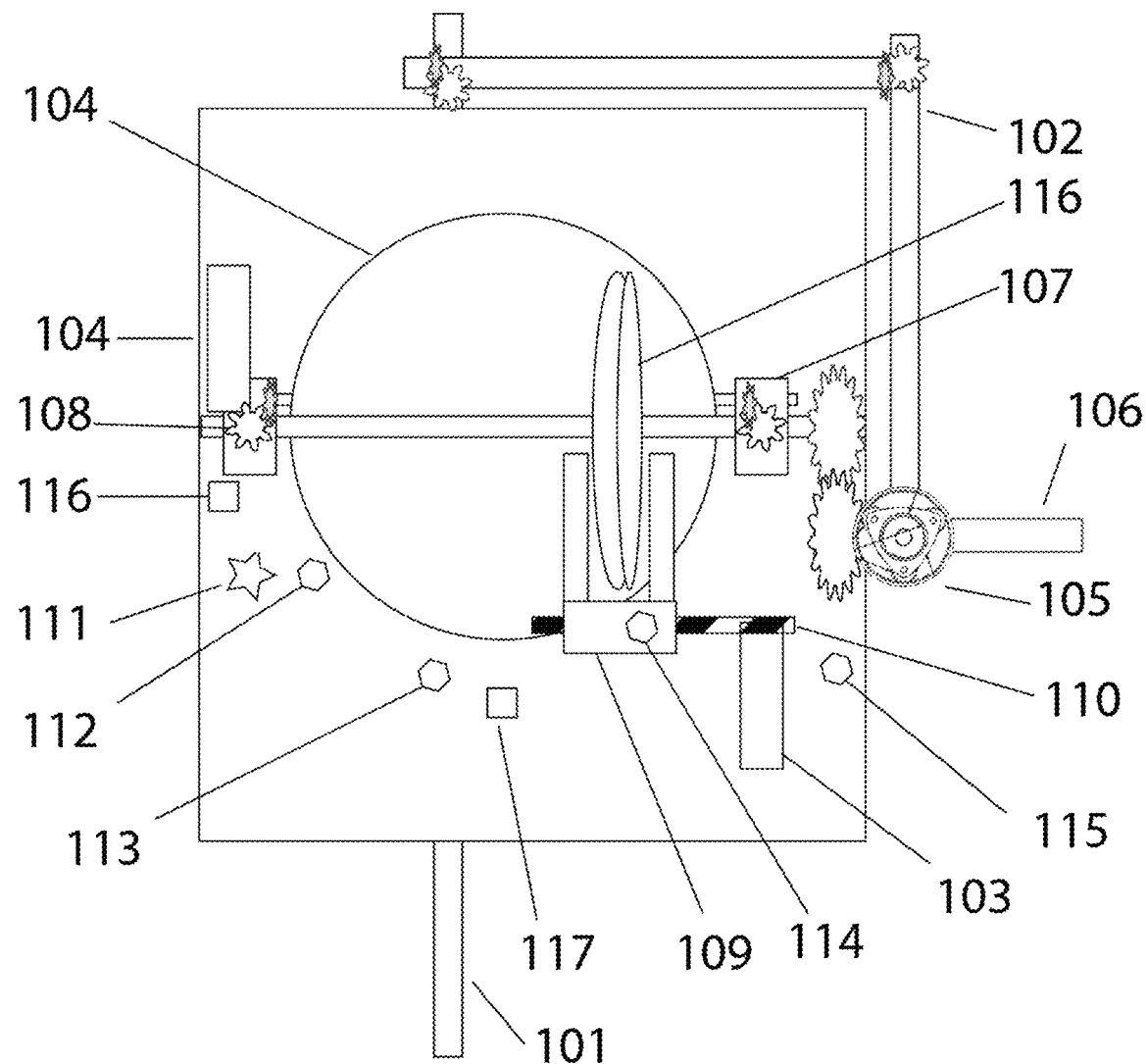
FIG. 1 SPIVT Assembly Diagram
Figure 6:
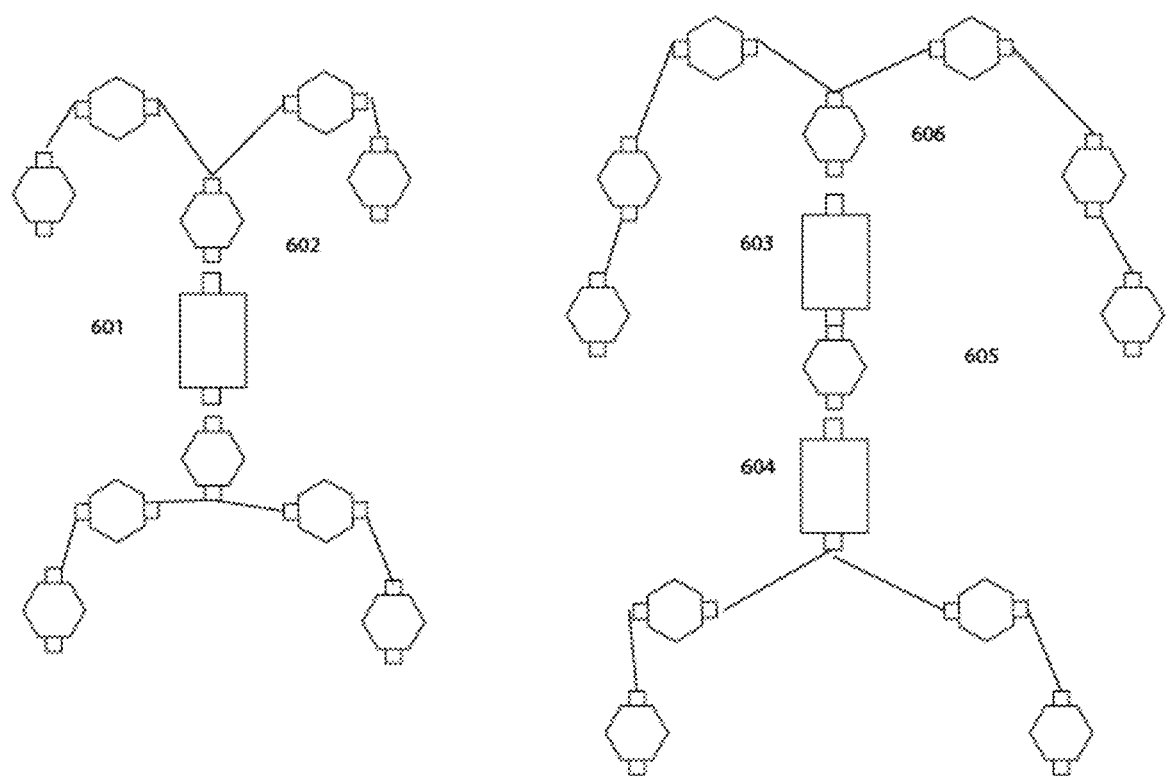

FIG. 1
101 Input shaft
102 Input tap drive train
103 Slip modulator
104 Ratio modulator
105 Planetary gear—power summing of CVT and alternate path to create RIVT
106 Output shaft
107 Slip height gear train
108 Slip height gear train
109 Ratio position fork
110 Ratio screw rod
111 LED illuminators—element of proprioceptive sensor array
112 Light/IR detector—element of proprioceptive sensor array
113 Light/IR detector—element of proprioceptive sensor array 114 Light/IR detector—element of proprioceptive sensor array
115 Light/IR detector—element of proprioceptive sensor array
116 Mirror—element of proprioceptive sensor array
117 Mirror—element of proprioceptive sensor array
FIG. 2
201 Input shaft
202 Strain gauge
203 Controller
204 Power
205 Reverse, geared up path
206 Friction Drive CVT
207 Light/IR detectors—element of proprioceptive sensor array
208 Non-round drive shaft, wheel slides on bearings
209 Linked threaded rods
210 Ratio modulator
211 Slip modulator
212 Planetary gear—power summing of CVT and alternate path to create RIVT
213 Output shaft
214 Inset—wheel on disk geared axle
FIG. 3
301 Wheel on-edge view
302 Input disk
303 Ratio changing movement
304 Output Disk
305 Wheel side view
306 Slip changing movement
307 And/or
308 Top view, showing hidden wheel between input/output disks
FIG. 4
401 Wheel on disk CVT
402 Toroid CVT
403 Wheel on cone CVT
404 Wheel on dual cone CVT
FIG. 5
501 Wheel on disk CVT with multiple CVT outputs sharing input disk
502 Input disk
503 RIVT assembly gear train
504 Wheel axle
505 Wheel
506 Second CVT
507 Third CVT
508 Fourth CVT
FIG. 6
601 Single motor powering SPIVT graph
602 SPIVT receiving input from motor, sending output to 2 SPIVTs in upper SPIVT tree
603 Motor 1 in a 2 motor SPIVT graph
604 Motor 2 in a 2 motor SPIVT graph
605 Motor coupling SPIVT, able to boost one motor with another or remain neutral
606 SPIVT receiving input from motor 1, sending output to upper SPIVT tree

REFERENCE TO DEPOSITED BIOLOGICAL MATERIAL

Not applicable to this application.

SEQUENCE LISTING FREE TEXT

Not applicable to this application.

CITATION LIST

Patent Literature

U.S. Pat. No. 8,251,863B2 Continuously variable transmission with multiple outputs
PCT/FR2017000174 Variable Diameter Gears Transmission
Friction Drive Transmissions U.S. Pat. No. 761,384 Lambert 1904 friction-gearing disk drive transmission
U.S. Pat. No. 954,977 Lambert 1910 friction-gearing disk drive transmission
20140179478 Continuously variable bicycle transmission mechanism and bicycle hub
U.S. Pat. No. 9,481,244 Friction drive system for a utility machine Multi-gear Transmissions
https://pinion.eu/en/p-line/technology/
CVTs
U.S. Pat. No. 5,071,394 Continuously variable transmission
IVTs
8512195 https://www.fallbrooktech.com/nuvinci-technology Non Patent Literature SRI Inception Drive
https://spectrum.ieee.org/video/robotics/robotics-hardware/sri-inception-drive-infinitely-variable-transmission
Moore et al. 1999 Design of a 3R cobot using continuous variable transmissions
https://patents.google.com/scholar/9633024913216467758?oq=8251863+
Quigley et al. 2011 A low-cost compliant 7-DOF robotic manipulator
https://patents.google.com/scholar/12440838951463282298?oq=8251863+
A Review of Dynamic CVT-IVT Transmissions
https://www.researchgate.net/301439784_A_Review_of_Dynamic_CVT-IVT_Transmissions
Continuously variable transmission
https://wikivisually.com/wiki/Continuously_variable_transmission
Guigan Rack transmissions
http://oppertus.com/rack.htm

I claim:

1. A transmission system, comprising:
   an input shaft, having a central axis of rotation, for coupling to a source of rotational motion;
   a RIVT (reversible infinitely variable transmission) comprised of a variator modulated by a ratio modulator;
   a slip modulator utilized for programmable slip between input and output shafts and minimized mechanical losses;
   a computer controller to sense and communicate the state of the system and to translate requested actuation and configuration to the ratio modulator and slip modulator reaction;
   an output shaft for coupling to the joint workload and/or another transmission.

2. The transmission of claim 1, further comprising:
   a proprioceptive robotic sensing system sensor array with at least one sensing point and at least one sensed variable.

3. The transmission of claim 1, further comprising:
   wherein the continuously variable transmission in the reversible infinitely variable transmission is comprised of a wheel on disk continuously variable transmission variator comprised of:

a rigid input disk mechanically coupled to the rotational power upon which rests, against the side of the rotating disk along a radial line,
with variable pressure modulated by the slip modulator,
a polymer-edged wheel, electromechanically position controlled by the ratio modulator mechanism, mechanically coupled to a two input one output planetary gear to create the controlled, modulated, and sensed RIVT output rotation.

4. The transmission of claim 1, further comprising:
variator comprised of:
a rigid input disk mechanically coupled to the rotational power upon which rests, against the side of the rotating disk along a radial line,
with variable pressure modulated by the slip modulator,
a plurality of polymer-edged wheels, electromechanically position controlled by the ratio modulator mechanism, mechanically coupled to a plurality of two input one output planetary gear to create the controlled, modulated, and sensed RIVT output rotation,
for the purposes of increasing torque limits, providing rapid switching between ratios, and multiple independent outputs each with their own ratios.

5. The transmission of claim 1, further comprising:
variator comprised of:
a two rigid disks, one mechanically coupled to the rotational power upon which rests, against the side of the rotating disks along radial lines where the disks may be coaxial or offset edge to center,
with variable pressure modulated by the slip modulator,
a polymer-edged wheel, electromechanically position controlled by the ratio modulator mechanism, the other disk mechanically coupled to a two input one output planetary gear to create the controlled, modulated, and sensed RIVT output rotation.

6. The transmission of claim 1, further comprising:
wherein the continuously variable transmission in the reversible infinitely variable transmission is comprised of a wheel on dual cones continuously variable transmission with integrated slip and ratio modulators.

7. The transmission of claim 1, further comprising:
wherein the continuously variable transmission in the reversible infinitely variable transmission is comprised of a toroidal continuously variable transmission with integrated slip and ratio modulators.

8. The transmission of claim 1, further comprising:
wherein the continuously variable transmission in the reversible infinitely variable transmission is comprised of a Guigan rack transmission and a separate slip modulated coupling.

9. The transmission of claim 1, further comprising:
wherein the reversible infinitely variable transmission is comprised of a planetary CVT (continuously variable transmission) in IVT (infinitely variable transmission) configuration and a separate slip modulated coupling.

10. A transmission system, comprising:
an input shaft, having a central axis of rotation, for coupling to a source of rotational motion;
one or more RIVT (reversible infinitely variable transmission) successively coupled stages comprised of:
a variator modulated by a ratio modulator;
a slip modulator utilized for programmable slip between input and output shafts and for minimized mechanical losses;
a computer controller to sense and communicate the state of the system and to translate requested actuation and configuration to the ratio modulator and slip modulator reaction;
an output shaft for coupling to the joint workload and/or another transmission.

11. The transmission of claim 1, further comprising:
a one-way clutch on the input shaft.

12. The transmission of claim 1, further comprising:
a brake on the input shaft.

13. A robot comprising:
one or more sources of rotational motion,
a plurality of transmissions of claim 1 each with input shafts connected to sources of rotational motion and output shafts, producing rotational motion, connected to joint workloads and/or the inputs of other transmissions resulting in one or more mechanical power trees, mechanical power flow in one direction through a series of links with no loops, or mechanical power graphs, mechanical power flow in multiple directions through a series of links with loops, of connections,
a controller network comprised of a computer linked with the transmission controllers modulating ratios of each transmission to effect the desired delivery of power to each subsection of the graph and movements for each robotic joint while integrating sensor data.

14. The robot of claim 13,
wherein one or more of the transmissions are comprised of:
the continuously variable transmission in the reversible infinitely variable transmission is comprised of a wheel on disk continuously variable transmission variator comprised of:
a rigid input disk mechanically coupled to the rotational power upon which rests, against the side of the rotating disk along a radial line,
with variable pressure modulated by the slip modulator,
a polymer-edged wheel, electromechanically position controlled by the ratio modulator mechanism, mechanically coupled to a two input one output planetary gear to create the controlled, modulated, and sensed RIVT output rotation.

15. The robot of claim 13,
wherein one or more of the transmissions are comprised of:
variator comprised of:
a rigid input disk mechanically coupled to the rotational power upon which rests, against the side of the rotating disk along a radial line,
with variable pressure modulated by the slip modulator,
a plurality of polymer-edged wheels, electromechanically position controlled by the ratio modulator mechanism, mechanically coupled to a plurality of two input one output planetary gear to create the controlled, modulated, and sensed RIVT output rotation,
for the purposes of increasing torque limits, providing rapid switching between ratios, and multiple independent outputs each with their own ratios.

16. The robot of claim 13,
wherein one or more of the transmissions are comprised of:
wherein the continuously variable transmission in the reversible infinitely variable transmission is comprised of a toroidal continuously variable transmission with integrated slip and ratio modulators.

17. The robot of claim 13,
wherein one or more of the transmissions are comprised of:
wherein the continuously variable transmission in the reversible infinitely variable transmission is comprised of a Guigan rack transmission and a separate slip modulated coupling.

\* \* \* \* \*